United States Patent [19]
Mormann et al.

[11] Patent Number: 5,569,727
[45] Date of Patent: Oct. 29, 1996

[54] ANTISTROSPIC POLYMERS AND METHOD OF PRODUCING THEM

[75] Inventors: Werner Mormann, Kreuztal; Christoph Irle, Siegen, both of Germany

[73] Assignee: Europeaische Wirtschaftsgemeinschaft, Luxembourg, Luxembourg

[21] Appl. No.: 433,344

[22] PCT Filed: Sep. 7, 1994

[86] PCT No.: PCT/EP94/02979

§ 371 Date: May 8, 1995

§ 102(e) Date: May 8, 1995

[87] PCT Pub. No.: WO95/07308

PCT Pub. Date: Mar. 16, 1995

[30] Foreign Application Priority Data

Sep. 8, 1993 [LU] Luxembourg ............... 88405

[51] Int. Cl.⁶ .......... C08G 18/00; C08G 18/77; C09K 19/38
[52] U.S. Cl. ............ 525/528; 528/73; 528/51; 528/52; 528/53; 528/54; 528/55
[58] Field of Search ............ 525/528; 528/73, 528/51, 52, 53, 54, 55

[56] References Cited

U.S. PATENT DOCUMENTS 4,762,901  8/1988  Dhein et al. ............... 528/73
5,314,983  5/1994  DeMeuse et al. ........... 528/73

*Primary Examiner*—Frederick Krass
*Attorney, Agent, or Firm*—McAulay Fisher Nissen Goldberg & Kiel, LLP

[57] ABSTRACT

The invention describes anisotropic polymers of diepoxide A having the formula (I)

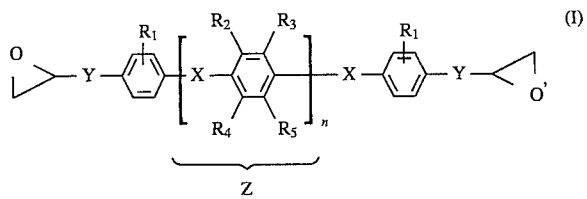

and anisotropic polymers of diisocyanate B having the formulas (II) to (VII)

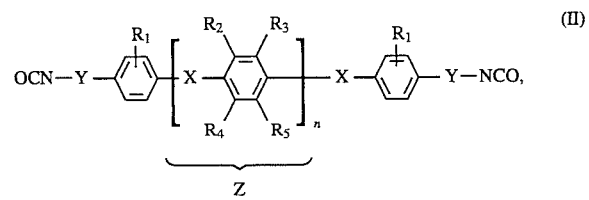

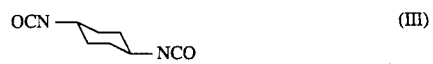

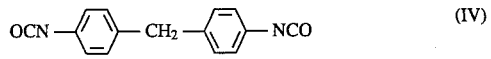

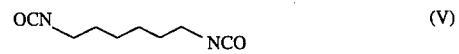

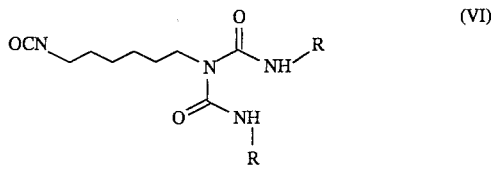

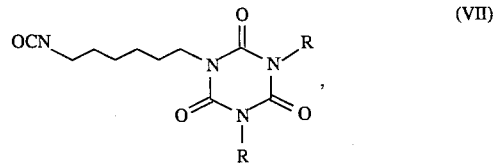

where as defined in the specification.

16 Claims, No Drawings

ANTISTROSPIC POLYMERS AND METHOD OF PRODUCING THEM

BACKGROUND OF THE INVENTION

The invention is directed to anisotropic polymers of liquid crystalline diepoxide and liquid crystalline diisocyanate and to a process for the production of these anisotropic polymers, possibly in the presence of catalysts, additional comonomers and other conventional additives.

Reaction products of bifunctional isocyanates and epoxies are known. They are usually designated as poly(isocyanurate oxazolidinones). It is also known that cyclotrimerization of isocyanates at lower temperatures first yields isocyanurate units which react with epoxy groups to form 5-membered oxazolidinone heterocycles only at elevated temperatures.

EP-A-0 252 359 describes the conversion of 4,4'-diisocyanatophenyl benzoate with 4-epoxypropoxybenzoic acid 4'-epoxypropoxyphenyl ester. The reaction product is opaque. It has no liquid crystalline phase textures and contains only crystallized reaction products. It is stated in EP-A-0 252 359 that anisotropic polymers occur by reaction of various monomers only when the reaction temperature lies within the liquid crystalline range of the educts.

Diepoxides with mesogenic properties are described in various published references. For example, it is known that mesogenic diepoxides yield polymers with optical anisotropy when converted with various reacting agents and also when homopolymerized. Japanese Patents 63-10617 (1988) and 58-206579 (1983) describe the synthesis of various triaromatic bisazomethine diglyceridyl ethers and -esters. "Synthesis, Characterization and Theory of Polymeric Networks and Gels", Ed. S. M. Ahorni, Plenum Press, New York 1992, p. 147, describes the preparation of polyepoxy networks from mesogenic diepoxides having liquid crystalline properties. The diaromatic and triaromatic diepoxides used have broad 1 c phases. Diisocyanates with liquid crystalline properties are also known (e.g., W. Mormann, M. Brahm, Polymer 43, 187 (1993)). Cyclotrimers of mesogenic, diaromatic monoisocyanates have very weakly expressed 1 c properties as compared to the monomeric educts. Normally, the liquid crystalline character is lost during the cyclotrimerization reaction.

SUMMARY OF THE INVENTION

The object of the present invention is to propose a combination of diisocyanates and diepoxides whose conversion always yields an anisotropic polymer and a process especially suited for the production of these anisotropic polymers.

According to the invention, this object is met by anisotropic polymers of diepoxide A having the formula (I)

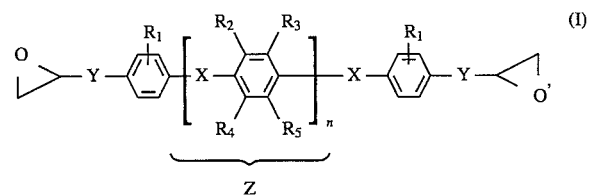

where

Y represents O—CH$_2$, CH$_2$ or a C—C single bond,

X represents the structure element

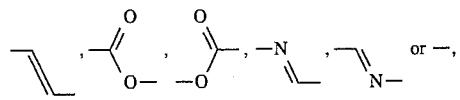

R$_1$ to R$_5$ represent, independently, hydrogen, halogen, a methyl, ethyl, propyl or butyl group or R$_2$, R$_3$, R$_4$ or R$_5$ represents a benzene group, R$_2$ to R$_5$ represent hydrogen when R$_1$ is not hydrogen, R$_1$ represents hydrogen when R$_2$ to R$_5$ do not equal hydrogen, and n is 1 to 3, where the middle group Z can also be a heteroaromatic ring with one or two hetero-nitrogen atoms or a cycloaliphatic trans-1,4-cyclohexylene group, and by anisotropic polymers of diisocyanate B having the formulas (II) to (VII)

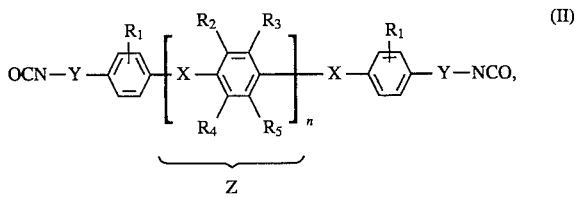

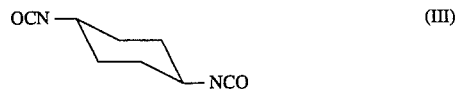

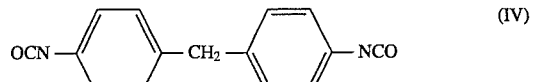

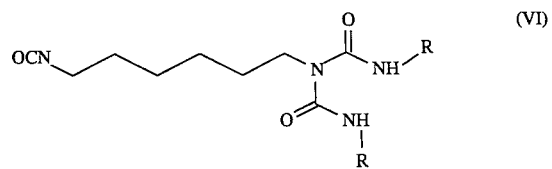

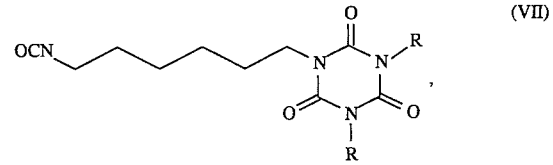

where

Y is a simple C—C bond, CH$_2$ or C$_2$H$_4$,

X is the structure element

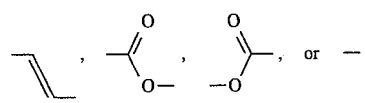

n is 0 or 1 and

R$_1$ to R$_5$ are the atoms or groups indicated in formula (I),

R is (CH$_2$)$_6$—NCO, where the middle group Z can also be a cycloaliphatic trans-1,4-cyclohexylene group.

The present invention also provides a process for the production of the anisotropic polymers of the type mentioned above, possibly in the presence of catalysts, additional comonomers and other conventional additives, which is characterized in that the liquid crystalline diepoxide A of formula (I) and the liquid crystalline diisocyanate B selected from the group formed of diisocyanates (II) to (VII) are converted at a temperature of approximately 100° to 300° C. in a molar ratio of approximately 2:1 to 1:4.

DETAILED DESCRIPTION OF THE INVENTION

The compounds indicated by formulas (I) to (VII) are designated as follows: trans-1,4-diisocyanatocyclohexane, methylenebis(4-isocyanatobenzene) (MDI), hexamethylene diisocyanate (HDI), HDI biuret: (bis(6-isocyanatohexylaminocarbonyl)-(6-isocyanatohexyl)amine) and tris(6-isocyanatohexyl)isocyanurate: (1,3,5-tris(6-isocyanatohexyl)-2,4,6-trioxohexahydro-1,3,5-triazine). The other monomers prepared according to the formulas mentioned above and their production are described, e.g., in W. Mormann, M. Brahm, *Polymer* 43, 187–194 (1993), W. Mormann, M. Brahm, *Macromolecules* 24, 1096–1101 (1991) and J. A. Mikroyannidis, *Makromol. Chem.* 190, 1867–1879 (1989).

When the anisotropic polymers according to the invention are halogen substituents, these are preferably fluorine, chlorine and bromine.

The appropriate molar ratio of diepoxide A to diisocyanate B in the anisotropic polymer according to the invention is essential for achieving the desired effect. If the ratio falls below 2:1, this may result in an unfavorably low crosslinking density. If a ratio of 1:4, for instance, is exceeded, this means that the disadvantageous characteristics of the isocyanurate structures predominate (crystallization, loss of l c characteristics). A particularly advantageous molar ratio of diepoxide A to diisocyanate B is approximately 1:1 to 1:1.5. The optimum value n in formulas (I) and (II), independently, is 1. Advantages are gained if Z in formula (I) is a heteroaromatic ring with 1 or 2 hetero-nitrogen atoms in the form of a pyridine or pyrimidine group or a cycloaliphatic trans-1,4-cyclohexylene group in the form of a trans- 1,4-cyclohexane dicarboxylic acid group.

The significance of the molar ratio of approximately 2:1 to 1:4 has already been discussed. The temperature range of approximately 100° to 300° C. should be maintained for the following reasons. The lower temperature limit is determined so that the monomers melt homogeneously. Formation of the oxazolidinone ring is prevented in an undesirable manner if the temperatures are too low. No advantage would be gained by exceeding the maximum temperature of 300° C. The temperature range is preferably approximately 150° to 220° C.

In general, it is advantageous to carry out the conversion in the presence of a catalyst. The following catalysts are preferred: tertiary amines (D. Braun, J. Weinert, *Angew. Makromol. Chem.* 78, 1 (1979)), blocked isocyanates (D. Caille, J. P. Pascault, L. Tighzert, *Polym. Bull.* 24, 31 (1990)), organoantimony compounds (M. Fujiwara et al., *J. Heterocycl. Chem.* 25, 1351 (1988)), tetraalkylammonium bromides and tetraalkylammonium iodides (D. Braun, J. Weinert, *Angew. Makromol. Chem.* 78, 1 (1979)), alkanolates (D. Braun, J. Weinert, *Liebigs Ann. Chem.* 1976, 221), 2-ethyl-4-methylimidazole (M. Uribe, K. A. Hodd, *Thermochim. Acta* 77, 367 (1984)), Lewis acid-base complexes: e.g., K. Ashida, *Eur. J. Cell. Plast.* 3 (4), 122 (1980) and AlCl3 triphenylphosphine oxide (e.g., A. Sendijarevic, K. C. Frisch, *J. Polym. Science Part C* 28, 199 (1990)). The amount of catalyst is not critical. The catalyst is advisably used in approximately 0.01 to 5 parts by weight for 100 parts by weight of the reactive components of the staging mixture.

In some cases it may be advantageous to subject the obtained anisotropic polymer to after-baking This baking is advisably carried out, e.g., for two hours at 150° C., one hour at 200° C. and one hour at 250° C.

In order to modify the characteristics of the anisotropic polymer, in particular to optimize the l c characteristics, melting point of the monomer mixture, solubility behavior of intermediate products in the form of isocyanurate units and the crosslinking density, it can be advantageous to convert a comonomer C in the form of a monoisocyanate, a monoepoxide or a dicyanate having the formula (VIII) together with the diepoxide A and diisocyanate B:

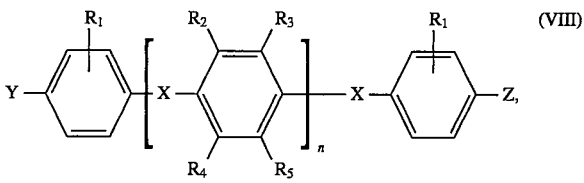

where

Y and Z are, independently, NCO, OCN or

Z additionally represents an alkyl, alkyloxy, alkyloxycarbonyl or acyloxy group with a chain length of 1 to 20 carbon atoms, possibly branched, X represents the structure elements

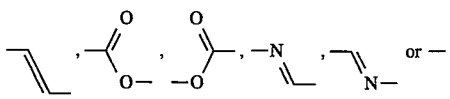

n is 0 or 1 and $R_1$ to $R_5$ represent the atoms or groups indicated in formula (I). It is advisable to use approximately 0.1 to 2 moles of comonomer C per mole of liquid crystalline diisocyanate B.

The reaction conditions of the process according to the invention, in particular the control of temperature and catalysis, have a significant influence on the properties of the desired anisotropic polymer. Preferable conditions are those under which the formation of isocyanurate groups is repressed. The cyclotrimers of mesogenic diisocyanates primarily occurring at low temperatures and with unsuitable catalysts are crystalline solids which precipitate out of the reaction mixture and react further only slowly. This difficulty is avoided according to the invention in particular by the selection of suitable reaction conditions. In so doing, the reaction advantageously starts at temperatures over approximately 200° C. It is possible to reduce the reaction temperature immediately after the melting of the starting materials. With certain isocyanate/epoxy compositions, in particular when using non-mesogenic diisocyanates, it is advisable to lower the temperature to a determined value for achieving optically anisotropic phases. The selection of suitable catalysts likewise has an effect on the results to be achieved according to the invention. For preparing the mesogenic polymers from the educts mentioned above, catalysts which catalyze the cyclotrimerization only subordinately are preferable, in particular the Lewis acid/Lewis base complexes mentioned above. It is also advantageous to use catalysts which catalyze in particular the formation of oxazolidinone (reaction product of isocyanate and oxirane) and suppress the formation of frequently insoluble isocyanurates. Optimization is also accomplished by special selection of isocyanates. Cyclotrimers of non-mesogenic, flexible diisocyanates are not so poorly soluble and are therefore capable of further reaction with epoxy groups in a particularly favorable manner.

The polymers according to the invention have optical anisotropy (a frozen mesophase) when at least one of the two monomers A and B have liquid crystalline properties. When a mixture is prepared from at least one of the two monomer types and the catalyst, this mixture melts and accordingly initiates polymerization. Depending on the structure of the monomers, the monomer mixture can be in the optically anisotropic state at the start of the reaction and can remain in this state during polymerization and after the reaction is concluded until reaching the thermal stability limit (decomposition). Another procedure within the scope of the invention consists in curing at a temperature at which the mixture exhibits isotropy and the anisotropic phase first occurs in the course of polymerization. The appropriate catalysts are known in principle.

Surprisingly, the formation of mesophases takes place during conversion of the above-mentioned starting materials of the process according to the invention, also in the isotropic temperature range of the educt mixture. This is astonishing for the person skilled in the art in that a system of a higher order than that occurring at the start of the reaction should not actually be expected by formation of 1,3-substituted five-membered rings. The formation of mesophases during the reaction of triaromatic diepoxides with non-mesogenic diisocyanates is likewise surprising. The commonly known methylenebis(4-isocyanatobenzene) and trans-1,4-diisocyanatocyclohexane are preferred.

The anisotropic polymers according to the invention have many advantages such as low thermal expansion and tensile strength in the direction of orientation. Due to these advantageous properties, they can be used as construction materials in the manufacture of insulating materials, laminates, composites, coverings and coatings through use of conventional processing methods.

The invention is explained more fully in the following by way of a number of examples:

EXAMPLE 1

(Production of Starting Compounds)

1. Preparation of a liquid crystalline diester diepoxide

Synthesis of hydroquinone bis(4-epoxypropoxybenzoate)

Hydroquinone bis(4-hydroxybenzoate) ( 17.5 g) and epichlorohydrin (139.0 g) are heated while stirred in a 500-ml two-neck flask with attached reflux condenser and magnetic stirrer until boiling. At boiling temperature, 0.15 g benzyltrimethylammonium bromide is added and the reaction mixture is kept in reflux for 90 minutes. The mixture is cooled, the precipitated solids are removed by suction, washed twice with epichlorohydrin and with ether and then dried under vacuum. The product is recrystallized from toluene.

Yield: 10.6 g melting point: 186° C. clearing temperature: 255° C. IR (Nujol): 1732 (C=O); 1504 ($CH_2$); 1072 (ether); 1256, 1160, 912, 838, 758 $cm^{-1}$ (oxirane)

| | |
|---|---|
| $^1$H-NMR: | 2.74, 2.89, 3.38(ABM,6H); 3.95, 4.29 (dd, $^3$J=11.3 Hz, 4H); |
| $CDCl_3$ | 6.92, 8.13(AA'XX', $^3$J=9.1 Hz, 8H); 7.19 ppm (s, 4H) |
| $^{13}$C-NMR: | 44.6, 49.9(epoxy-C); 68.9(methylene C); 114.5, 122.7, 132.4 |
| $CDCl_3$ | (tert. C); 122.3, 148.4, 162.8 (quart. C); 164.8 ppm (C=O) |
| $C_{26}H_{22}O_8$(462.46) | calculated C: 67.5   H: 4.8 |
| | actual C: 67.1   H: 4.9 |

2. Production of aluminum chloride triphenylphosphine oxide catalyst

A suspension of freshly sublimated aluminum chloride (0.633 g) in 10 ml benzene distilled over calcium hydride is prepared in a 50-ml protective-gas flask. Triphenylphosphine oxide (3.850 g) is added while stirring. The resulting pulpy mass is stirred for two hours at room temperature. The benzene is then removed by freeze-drying. A colorless powder results.

EXAMPLE 2

(Anisotropic Network of a Liquid Crystalline (Triaromatic) Diisocyanate and a Liquid Crystalline (Triaromatic) Diepoxide)

Methylhydroquinone bis(4-isocyanatobenzoate) (5.503 g), hydroquinone bis(4-epoxypropoxybenzoate) (6.125 g) and aluminum trichloride/triphenylphosphine oxide catalyst (0.13 g) are added to a 25-ml protective-gas flask. The mixture is homogenized. Approximately 0.5 mg of the prepared mixture is melted on a microscope heating stage at 220° C. and examined in polarized light. Textures of a nematic liquid crystalline phase are observed. The textures remain while the specimen cures. After 30 min, the specimen is solid. When heated to 300° C. at a heating rate of 20 K/min, no isotropy is observed.

| | |
|---|---|
| DSC: (10 K/min, 30° C., 30°–300° C.) | endotherm at 135° C. (melting of diioscyanate) exotherm at 195° C. (peak maximum) (reaction peak) |
| (90 min isotherm at 220° C., subsequently heated to 280° C. (20 K/min) | No glass transition is observed during subsequent heating from 220° C. to a temperature of 340° C. at a heating rate of 20 K/min. |

Production of test bar

A sample of the above-mentioned mixture of methylhydroquinone bis(4-isocyanatobenzoate), hydroquinone bis(4-epoxypropoxybenzoate) and aluminum trichloride/triphenylphosphine oxide catalyst is melted at 200° C. and baked for 1 hour at 180° C. and then for 2 hours at 240° C. The obtained test bar (23×13×2 mm) is not transparent.

EXAMPLE 3

Hydroquinone bis(4-epoxypropoxybenzoate) (3.060 g), hydroquinone bis(4-isocyanatobenzoate) (2.577 g) and aluminum trichloride/triphenylphosphine oxide catalyst (0.06 g) are homogenized and converted in a manner analogous to Example 1. An anisotropic product is obtained.

EXAMPLE 4

(Anisotropic Network of Liquid Crystalline (Diaromatic) Diisocyanate and a Liquid Crystalline (Triaromatic Diepoxide)

Corresponding to Example 2, a mixture of methylhydroquinone bis(4-epoxypropoxybenzoate) (5.073 g), 4,4'-diisocyanatophenyl benzoate (2.985 g) and aluminum trichloride/triphenylphosphine oxide catalyst (0.11 g) is prepared.

Approximately 0.5 mg of the mixture prepared in this way is examined under a polarizing microscope. When the mixture is melted at 210° C. and further processed isothermically, an optically isotropic melt is observed at first. After five minutes, the liquid becomes anisotropic. During the solidification of the reaction mixture, the occurring textures of a liquid crystalline phase are preserved. Heating of the cured polymer to 290° C. does not lead to isotropy.

| DSC: (10 K/min, 30° C., 30°–300° C.) | endotherm at 70° C.–110° C. (melting of educts) Broad exotherm reaction from 140° C. to 270° C. Peak maximum at 212° C. (reaction peak) |
|---|---|

2. Heating (20K/min, 30° C.–350° C.) Stage at 306° C.

EXAMPLES 5–9

Anisotropic networks are obtained when the following mixtures are prepared as in Example 1 and baked at appropriate temperatures:
2.94 g N,N'-bis(4-epoxypropoxybenzylidine)-1,4-diaminochlorobenzene
2.00 g 4,4'-diisocyanatophenyl benzoate
0.069 g aluminum trichloride/triphenylphosphine oxide catalyst
1.000 g 4,4'-diisocyanatophenyl benzoate
1.330 g N,N'-bis(4-epoxypropoxybenzylidene)-1,4-diaminomethylbenzene
0.034 g aluminum trichloride/triphenylphosphine oxide catalyst
1.000 g 4,4'-diisocyanatophenyl benzoate
1.330 g N,N'-bis(4-epoxypropoxybenzylidene)-1,4-diaminomethylbenzene
0.039 g ethyl methyl imidazole
3.811 g methylhydroquinone bis(4-epoxypropoxybenzoate)
4.614 g 4,4'-diisocyanatophenyl benzoate
0.08 g aluminum trichloride/triphenylphosphine oxide catalyst
5.077 g methylhydroquinone bis(4-epoxypropoxybenzoate)
1.537 g 4,4'-diisocyanatophenyl benzoate
0.10 g aluminum trichloride/triphenylphosphine oxide catalyst

EXAMPLE 10

(Anisotropic Network of Liquid Crystalline (Triaromatic) Diepoxide and Non-mesogenic (Aliphatic) Diisocyanate)

Corresponding to Example 2, a mixture of hydroquinone bis(4-epoxypropoxybenzoate) (5.347 g); trans-1,4-diisocyanatocyclohexane (1.921 g) and aluminum trichloride/triphenylphosphine oxide catalyst (0.11 g) is produced.

Approximately 0.5 mg of the mixture prepared in this way is examined under a polarizing microscope. When the mixture is melted at a temperature of 190° C. and further processed, the liquid, isotropic at first, becomes optically anisotropic after 15 minutes.

| DSC: (10 K/min, 30° C., 30°–300° C.) | endotherm at 67° C. (melting of diisocyanate) 1. Exotherm at 185° C. (peak maximum) 2. Exotherm at 245° C. (peak maximum) |
|---|---|

EXAMPLES 11 AND 12

Anisotropic networks are obtained when the following mixtures are prepared as in Example 1 and baked at suitable temperatures:
1.953 g trans-1,4-diisocyanatocyclohexane
5.606 g methylhydroquinone bis(4-epoxypropoxybenzoate)
0.11 g aluminum trichloride/triphenylphosphine oxide catalyst
1.300 hydroquinone bis(4-epoxypropoxybenzoate)
0.472 g 1,6-diisocyanatohexane
0.02 g aluminum trichloride/triphenylphosphine oxide catalyst

EXAMPLE 13

(Anisotropic Network of Mesogenic (Triaromatic) Bisazomethinediepoxide and Non-mesogenic (Aromatic-aliphatic) Diisocyanate)

Corresponding to Example 2, an equimolar mixture of 1,4-bis(4-epoxypropoxyphenylamine)dibenzylidene (2.73 l), methylene bis(4-isocyanatobenzene) (1.597 g) and aluminum trichloride/triphenylphosphine oxide catalyst (0.03 g) is produced.

Approximately 0.5 mg of the mixture prepared in this way is examined under a polarizing microscope. Melting at 220° C. and cooling to 150° C. leads to the formation of textures of a liquid crystalline phase.

| DSC: | 1. Cooling from 220° C. to 145° C. (20 K/min) 2. 180 min isotherm 145° C. 3. 190° C.–300° C. / 20 K/min | Glass transition is observed at 228° C. during subsequent heating from 30° C. at a heating rate of 20 K/min. |
|---|---|---|

EXAMPLE 14

(Anisotropic Network of Mesogenic (Triaromatic) Diester Diepoxide and Non-mesogenic (Aromatic-aliphatic) Diisocyanate)

Corresponding to Example 2, a mixture of hydroquinone bis(4-epoxypropoxybenzoate) (5.63 g), methylene bis(4-isocyanatobenzene) (3.05 g) and aluminum trichloride/triphenylphosphine oxide catalyst (0.11 g) is prepared.

Approximately 0.5 mg of the mixture prepared in this way is examined under a polarizing microscope. When the mixture is melted at a temperature of 240° C. and cooled directly at a heating rate of 20 K/min., the mixture is optically anisotropic when reaching a temperature of 220° C.

| DSC: | (10 K/min, 30° C., 30° C.–300° C.) | Endotherm at 40° C. (melting of diisocyanate) |
| --- | --- | --- |
|  |  | 1. Exotherm at 117° C. (peak maximum) |
|  |  | 2. Exotherm at 192° C. (peak maximum) |
|  | 1. Cooling from 240° C. to 190° C. | Glass transition is observed at 187° C. during |
|  | 2. 30 min isotherm 190° C. | subsequent heating from 30° C. at a heating |
|  | 3. 190° C.–300° C. / 20 K/min. | rate of 20 K/min. |

EXAMPLE 15

(Anisotropic Network from a Diaromatic Diisocyanate, a Triaromatic Diepoxide and a Triaromatic Dicyanate)

Corresponding to Example 1, a mixture of 4,4'-diisocyanatobiphenyl (2.734 g), methylhydroquinone bis(4-epoxypropoxybenzoate) (5.513 g), hydroquinone bis(4-cyanatobenzoate) (0.480 g) and aluminum trichloride/triphenylphosphine oxide catalyst (0.2 g) is prepared.

Approximately 0.5 mg of the mixture prepared in this way is examined under a polarizing microscope. Melting at 210° C. and cooling to 195° C. leads to the formation of textures of a liquid crystalline phase. The mixture cures at a temperature of 190° C. after 20 minutes.

COMPARISON EXAMPLE 1

(According to EP 0 252 359 A2 (Bayer AG, Inventors: R. Dhein, H. P. Müller, H. M. Meier R. Gipp))

4,4'-diisocyanatophenyl benzoate (3.412 g), 4-epoxypropoxyphenyl-4-epoxypropoxybenzoate (0.853 g) and dimethylbenzyl ammonium dibutyl phosphate (0.68 g) are homogenized according to the method described in Example 1. Approximately 0.5 mg of the mixture prepared in this way is placed on a specimen holder and melted at 150° C. The specimen is baked for 24 hours at 90° C. in the absence of air, then post-treated for 24 hours at 180° C. and for 24 hours at 200° C. The obtained product has an opaque appearance. Examination of the reaction product under a microscope in polarized light clearly reveals that the opaque appearance is a result of the formation of crystallites and does not derive from liquid crystalline properties of the formed network.

| DSC: (10 K/min. 30° C., 30°–300° C.) | Endotherm at 110° C. (melting of educts) Exotherm, peak maximum at 163° C. (reaction peak) |
| --- | --- |

We claim:

1. Anisotropic polymers produced by reacting diepoxide A having the formula (I)

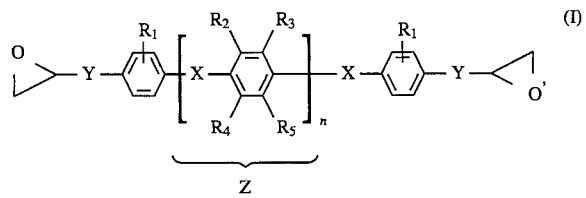

wherein

Y represents O—CH$_2$, CH$_2$ or a C—C single bond,

X represents the structure element

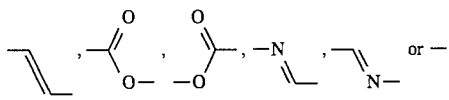

R$_1$ to R$_5$ represent, independently, hydrogen, halogen, a methyl, ethyl, propyl or butyl group or R$_2$, R$_3$, R$_4$ or R$_5$ represent a benzene group, R$_2$ to R$_5$ represent hydrogen when R$_1$ is not hydrogen, R$_1$ represents hydrogen when R$_2$ to R$_5$ are not equal to hydrogen, and n is 1 to 3, where the middle group Z can also be a heteroaromatic ring with one or two hetero-nitrogen atoms or a cycloaliphatic trans-1,4-cyclohexylene group; and diisocyanate B having the formula selected from the group consisting of formulas (II), (III), (IV), (V), (VI) and (VII),

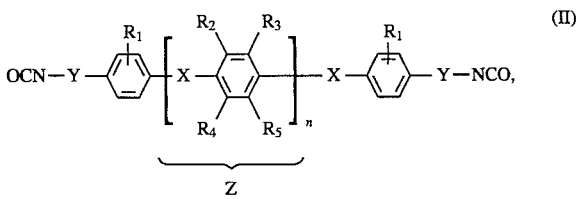

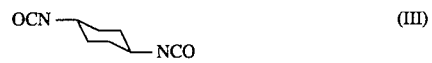

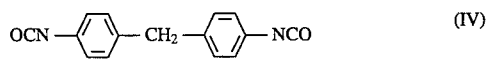

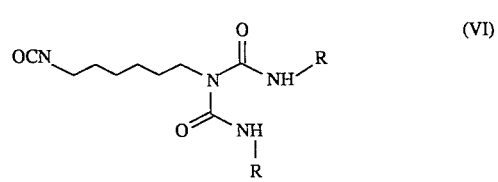

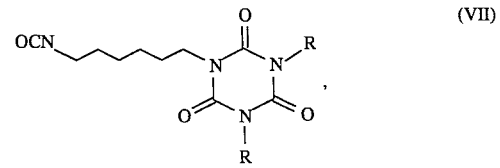

where

Y is a C—C bond, CH$_2$ or C$_2$H$_4$,

X is the structure element

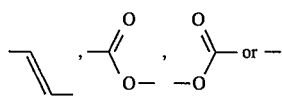

n is 0 or 1 and $R_1$ to $R_5$ are the atoms or groups indicated in formula (I), where the middle group Z can also be a cycloaliphatic trans-1,4-cyclohexylene group and R is $(CH_2)_6$—NCO, wherein the molar ratio of diepoxide A to diisocyanate B is from about 2:1 to 1:4.

2. The anisotropic polymers of claim 1 wherein the molar ratio of diepoxide A to diisocyanate B is from about 1:1 to 1:1.5.

3. The anisotropic polymers of claim 1 wherein n in formulas (I) and (II) is 1.

4. The anisotropic polymers of claim 2 wherein n in formulas (I) and (II) is 1.

5. A process for the production of the anisotropic polymers of claim 1 comprising reacting the diepoxide A of formula (I) and the diisocyanate B by heating a mixture thereof at a temperature of from about 100° to 300° C. in a molar ratio of approximately 2:1 to 1:4.

6. The process of claim 5 wherein the heating temperature is from about 150° to 220° C.

7. The process of claim 6 wherein the reaction is carried out in the presence of a catalyst.

8. The process of claim 6 wherein the reaction is carried out in the presence of a catalyst and the anisotropic polymer obtained is subjected to a baking step.

9. The process of claim 7 wherein the catalyst is a complex of a Lewis acid and a weak Lewis base.

10. The process of claim 7 wherein the catalyst is a complex of a Lewis acid and a weak Lewis base and the anisotropic polymer obtained is subjected to a baking step.

11. The process of claim 7 wherein the catalyst is an aluminum chloride triphenylphosphine oxide complex.

12. The process of claim 7 wherein the amount of catalyst is from about 0.1 to 5 parts by weight for 100 parts by weight of diepoxide A and diisocyanate B.

13. The process of claim 5, wherein the anisotropic polymer obtained is subjected to a baking step.

14. The process of claim 5, wherein a comonomer C which is a monoisocyanate, a monoepoxide or a diisocyanate having the formula (VIII) is reacted simultaneously with the diepoxide A and diisocyanate B;

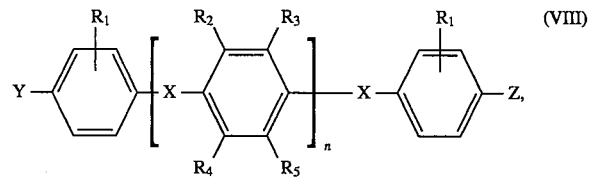

where

Y and Z are, independently, NCO, OCN or

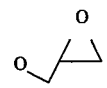

Z is an alkyl, alkyloxy, alkyloxycarbonyl or acyloxy group with a chain length of 1 to 20 carbon atoms, optionally branched, X represents the structure elements

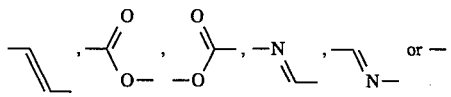

n is 0 or 1 and $R_1$ to $R_5$ represent the atoms or groups indicated in formula (I).

15. The process of claim 14, wherein about 0.1 to 2 moles of comonomer C are used per mole of diisocyanate B.

16. The process of 15, wherein the anisotropic polymer product is oriented by subjecting it to an electric or magnetic field.

* * * * *